Figure 1:
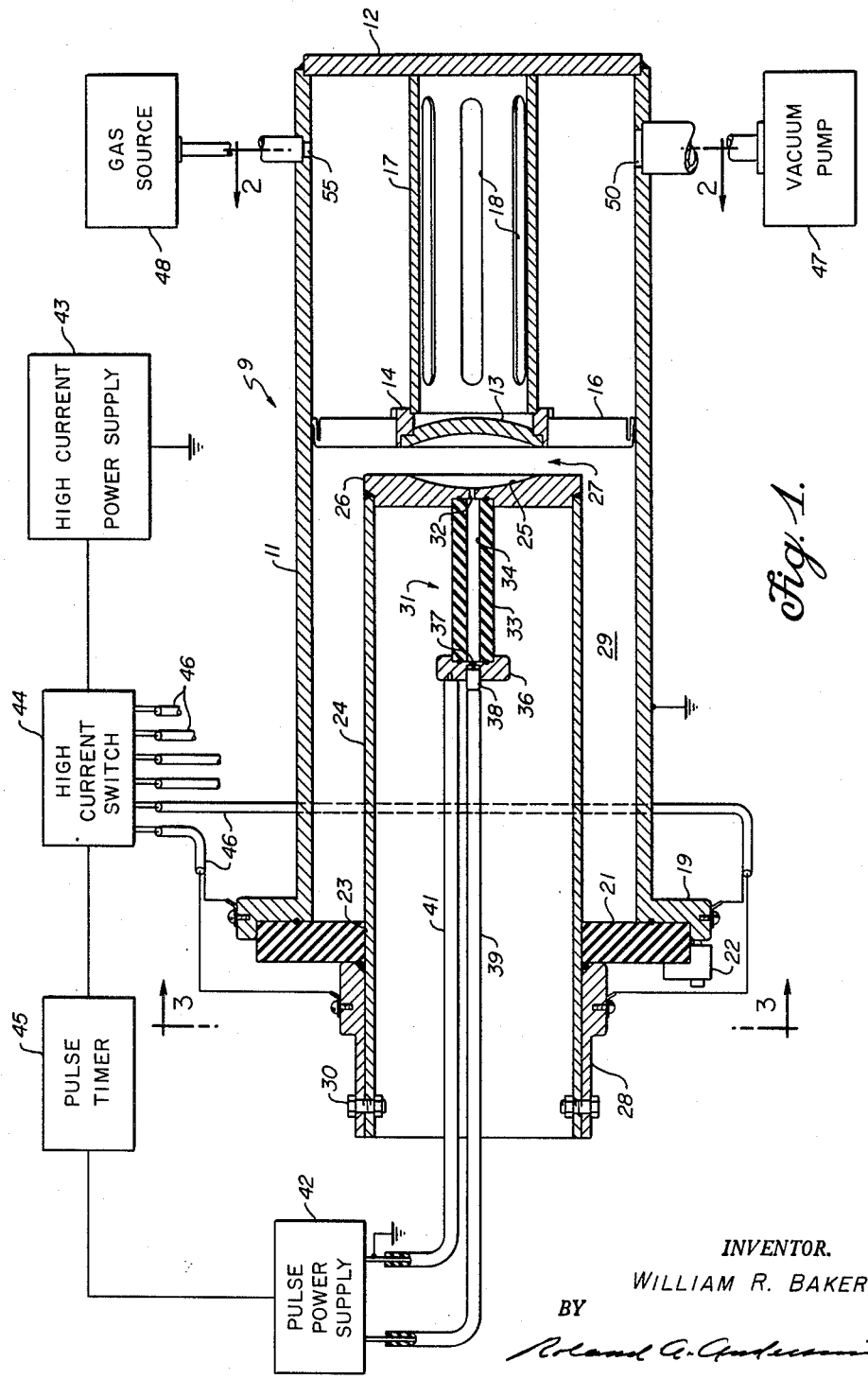

INVENTOR.
WILLIAM R. BAKER
BY
Roland A. Anderson
ATTORNEY.

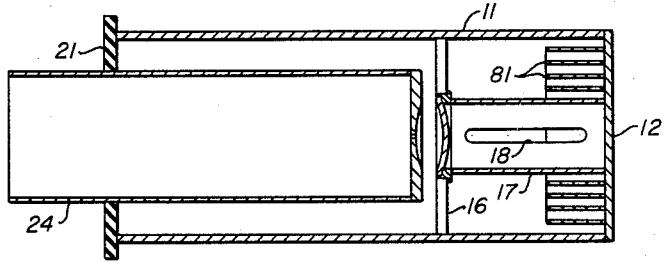
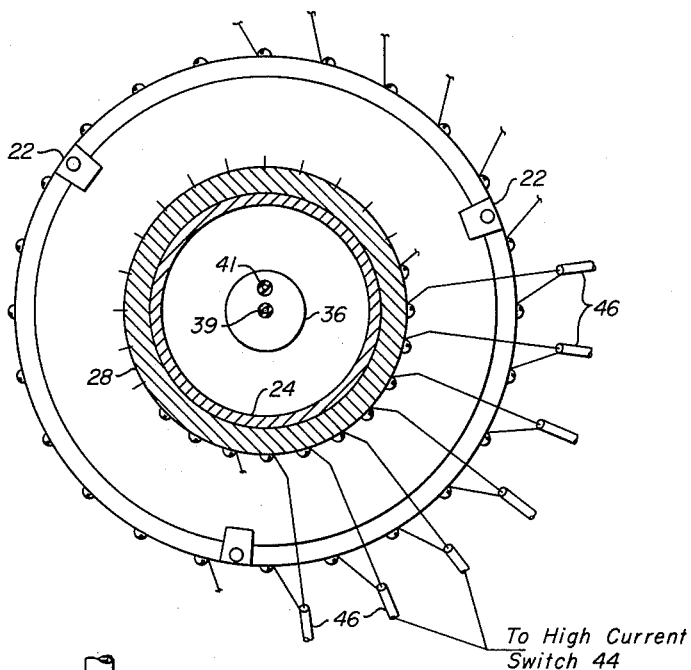
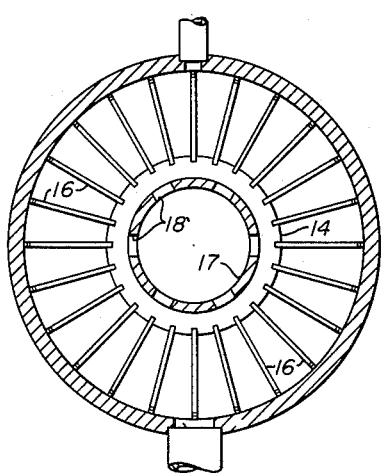

Nov. 10, 1964 W. R. BAKER 3,156,623
PLASMA SWITCHING PINCH TUBE
Filed March 2, 1962 3 Sheets-Sheet 3
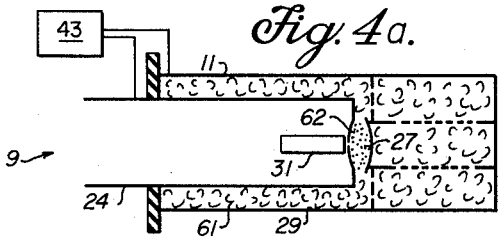
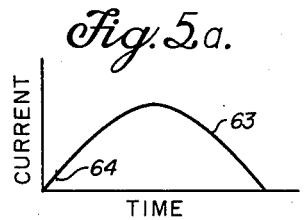
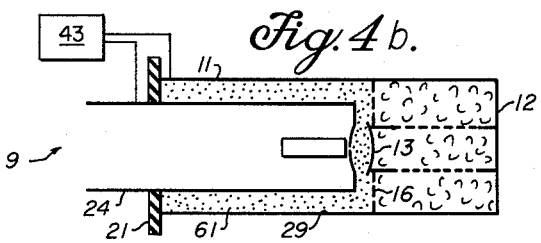
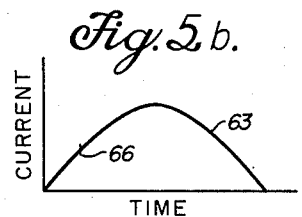
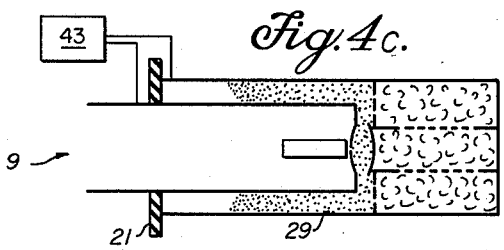
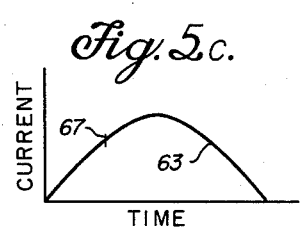
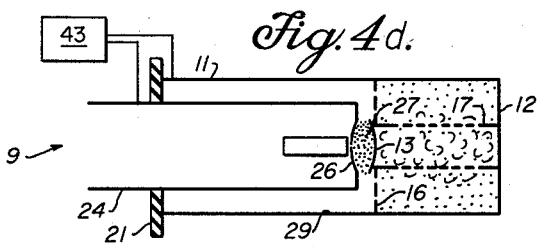
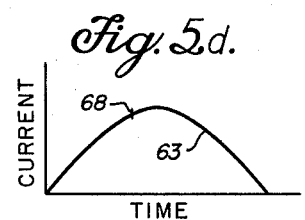
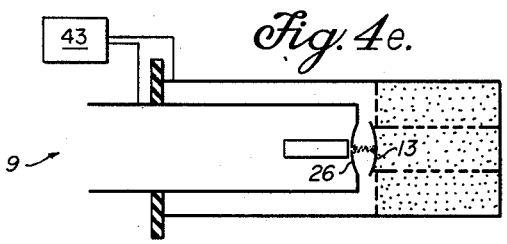
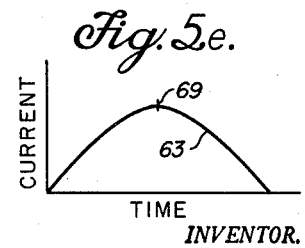
INVENTOR.
WILLIAM R. BAKER
BY
ATTORNEY.

United States Patent Office 3,156,623
Patented Nov. 10, 1964

3,156,623
PLASMA SWITCHING PINCH TUBE
William R. Baker, Orinda, Calif., assignor to the United States of America as represented by the United States Atomic Energy Commission
Filed Mar. 2, 1962, Ser. No. 177,140
8 Claims. (Cl. 176—8)

The present invention relates to magnetohydrodynamic devices and more particularly to apparatus for generating, heating and containing an ion-electron plasma and having an novel configuration wherein the plasma is maintained substantially free from contamination while being subjected to extremely intense heating current.

In the generation of heated plasma from light fuel gas to produce ions, neutrons, nuclear interactions or for other purposes, it is important that the purity of the gas be preserved if maximum plasma temperature is to be obtained. The principal source of impurities in prior plasma devices is insulators which readily release contaminants when struck by the energetic particles which are present in a hot plasma. In plasma devices of the pinch class, however, an electric field is required so that an insulator is a necessary component of the apparatus. In general, prior solutions to the problem of plasma contamination have involved the isolating of hot plasma from the vicinity of the insulators. In copending application Serial No. 37,816; filed June 21, 1960, for Plasma Heating and Confining Device and issued on February 13, 1962, as U.S. Patent No. 3,021,272; application Serial No. 112,132, filed May 23, 1961, for Counter-Rotating Plasma Device, and issued July 2, 1963 as U.S. Patent No. 3,096,269; and application Serial No. 157,863, filed December 7, 1961, for Plasma Generator, and issued September 17, 1963, as U.S. Patent No. 3,104,345, there are described magnetohydrodynamic devices in which insulators are protected from contact with the hot plasma.

The present invention provides a differing and improved mechanism for preventing plasma contamination by the insulators. In particular, a novel pinch tube configuration is used in which the portion of the plasma which is initially adjacent the insulator is separated from the remainder leaving the latter in an extremely pure condition for subsequent additional heating. The device operates in three stages, a first stage in which gas in the device is ionized; a second stage where the plasma in the vicinity of insulators is removed; and a third stage where the remaining plasma is heated. There is no well defined break in operation between the three stages, the stages of operation occurring in very rapid sequence after the application of power to the device.

A further important consideration in plasma devices is providing for the application of peak current from the power supply to the plasma device at the most advantageous moment. The inherent stray inductance in the plasma device and associated circuitry causes the power supply current to gradually rise to a peak and then decline. A plasma column forms in the plasma device, exists for a short period, and then disperses. To obtain maximum heating, the occurrence of peak current should coincide with the time period during which the plasma column exists. In many plasma devices, the formation of the plasma column cannot be delayed until the current reaches a maximum. Hence, maximum heating is not obtained.

In addition to the advantages hereinbefore discussed, the present invention provides means by which the formation of the plasma column is delayed until the peak current is passing through the device.

In a preferred form the invention is comprised of an outer conducting cylinder closed at each end and with one of the end closures being an insulator. An inner conducting cylinder of smaller diameter transpierces the insulator and extends along the axis of the outer cylinder to an intermediate point therein. A disc electrode is also disposed coaxially within the outer cylinder and is spaced from the end of the inner cylinder to form an arc gap therebetween. Radially directed conductors connect the disc electrode with the outer cylinder. The space on the opposite side of the disc from the arc gap constitutes a chamber for receiving contaminated plasma.

For operation, fuel gas such as deuterium is admitted to the evacuated outer cylinder and a high current pulse is applied between the inner and outer cylinders at points thereon adjacent the insulator whereupon the several stages in the operation of the invention occur sequentially as a result of the described novel configuration. An arc discharge is initiated at a central point in the arc gap and rapidly spreads symmetrically between the inner and outer cylinders, the gas thereby being ionized to form a plasma. In the second stage the contaminated plasma between the walls of the two cylinders is accelerated away from the insulation and into the receiving chamber by the magnetic field of the arc, leaving the plasma in the arc gap space between the disc electrode and the end of the smaller cylinder isolated from the insulator and cylinder walls. In the third stage of operation, the pure plasma in the arc gap is compressed and heated by the well known pinch effect with minimal contamination from particles from walls and insulator and with maximum current.

As the plasma is heated, interactions between component particles occur at increasing rates, the heated plasma being an excellent source of ions and neutrons. With sufficient heating, nuclear fusion reaction rates attain significant values in the compressed uncontaminated plasma.

Therefore, it is an object of the present invention to provide an improved apparatus for the generation, containment and heating of an electrical plasma.

It is another object of the present invention to provide a superior means for producing a substantially contaminant free plasma.

It is another object of the present invention to provide a plasma generator of the pinch tube class having means for synchronizing formation of the pinch discharge with the occurrence of peak power supply current.

It is a further object of the present invention to provide a plasma generator having means for preventing insulator contaminated plasma from mixing with pure plasma.

It is another object of the invention to provide a means for delaying the pinching operation of a plasma generator until maximum current is applied thereto.

It is a further object of the present invention to provide a new means for isolating the insulation of a magnetohydrodynamic device from the main arc gap.

It is still a further object of the present invention to provide a device for forming a pure plasma in which three stages of operation are employed to first create a plasma, next to remove contaminated plasma, and then to compress and heat the remaining plasma.

The invention will be better understood by reference to the accompanying drawings of which:

FIGURE 1 is an axial section view of the invention with certain components of the electrical circuitry indicated in block form, FIGURE 2 is a cross-sectional view taken at line 2—2 of FIGURE 1, FIGURE 3 is a cross-sectional view taken at line 3—3 of FIGURE 1, FIGURES 4a to 4e are simplified views of the invention showing successive stages in the operation thereof, FIGURES 5a to 5e are graphical curves showing variations in the current supplied to the invention with change in time, and FIGURE 6 is a simplified view of the apparatus of FIGURE 1 with the addition of a plasma motion dissipating baffle.

Referring now to FIGURE 1, 2 and 3, there is shown a plasma pinch tube 9 having a conductive outer cylinder or housing 11 made of tungsten or similar material. The cylinder 11 has a length two or three times greater than the diameter and has one end closed by a conductive end closure 12. A first disc shaped conductive electrode 13 inset into a retainer ring 14 with a concave surface facing away from the closure 12, is disposed coaxially within the outer cylinder 11 near the end closure 12 and is electrically connected to the cylinder 11 by a plurality of conductive stainless steel fingers or fins 16 radiating outwardly from the ring 14 and contacting the inner wall of the cylinder. Such fins 16 are spaced sufficiently that accelerated plasma can readily pass therebetween. The ring 14 is spaced from the cylinder end closure 12 by a coaxial conductive tube 17 having wall openings 18 for the passage of gas.

An annular flange 19 is provided on the opposite end of the cylinder 11 and functions both as an electrical terminal and as a support member for an annular alumina insulator 21. A plurality of nylon lugs 22 are bolted to the flange 19, projecting over the edge of the insulator 21 and physically securing the insulator 21 to the flange in coaxial relationship thereon. The insulator 21 has a central opening 23 with a diameter less than the diameter of the outer cylinder 11 to receive an inner copper cylinder 24 which extends coaxially within the outer cylinder 11 to a point near the first electrode 13. The inner end of the inner cylinder 24 is closed by a second disc electrode 26 having a central concave portion 25 which faces the first electrode 13, leaving a gap 27 therebetween. Thus an annular plasma chamber 29 is formed between the inner cylinder 24 and outer cylinder 11 which chamber includes the gap 27. The diameter of second electrode 26 is greater than that of first electrode 13.

A brass annular sleeve 28 encircles the portion of the inner cylinder 24 which protrudes outside the insulator 21. One end of the sleeve 28 bears against the insulator 21 while the opposite end is secured to the inner cylinder 24 by suitable bolts 30.

To initiate the ionization of gas in the device, and to insure the symmetry of the arc discharge through the various stages of operation, a spark gap element 31 is disposed along the axis within the inner cylinder 24 adjacent a small opening 32 in the center of the concave portion 25 of second electrode 26. A cylindrical insulator 33 having a central bore 34 is disposed coaxially between the opening 32 and a spark gap ring 36 which has a central gap electrode 37 facing the bore 34. The gap electrode 37 is insulated from and separated from the ring 36 by a coaxial gap insulator 38, however, the end of the central electrode 37 is uninsulated so that an arc can readily form between the electrode 37 and the ring. Electrical pulses for causing an arc are supplied through a pair of insulated wires 39 and 41 connected from the gap electrode 37 and from the ring 36 respectively to a pulse power supply 42. Thus the arc in the tube 9 is always initiated at the same point.

Considering now the electrical power supply and connections thereof, a high current power supply 43 is provided and is of the type which includes a large bank of capacitors which can be charged to a high potential. A very large quantity of power is available from such a capacitor bank in a very short time, peak power being limited primarily only by stray inductance in the power supply, connecting cables, and in the pinch tube 9. A high current switch 44 is connected between the output of the power supply 43 to a plurality of coaxial cables 46 which have outer shields connected to the annular flange 19 and having center conductors connected to the sleeve 28. The connections to the cables 46 are distributed evenly around the flange 19 and sleeve 28 to obtain an even flow of current at all points around the circumference of the device. It is necessary that such connections be made near the insulator 21 so that the shortest path for current from the power supply is at the insulator. This is necessary so that the proper magnetic fields will be created in the device as discussed later. In a typical embodiment of the invention, fifty equally spaced cables 46 conduct the current from the switch 44 to the pinch tube 9. A pulse timer 45 is operatively connected to the high current switch to co-ordinate the production of pulses in the spark gap power supply 42 with closing of the primary current switch 44.

To supply the desired atmosphere to the chamber 29, openings 50 and 55 are made in the outer cylinder 11 near the end 12 for connection to a vacuum pump 47 and to a gas source 48 respectively. After the chamber 29 has been evacuated by the vacuum pump, an ionizable fuel gas such as deuterium or tritium is admitted from the gas source 48. Conventional O-ring vacuum seals are included at appropriate places to maintain vacuum integrity in the tube 9.

Considering now the operation of the device, the spark gap element 31 is timed to fire, by the pulse timer 45, shortly after the primary power switch 44 is closed. Consequently, an arc forms between the ring 36 and the gap electrode 37, supplying a copious quantity of ions and electrons. Since the ring 36 is at ground potential and the inner cylinder 24 is at a higher potential, an arc occurs from the ring 36 through the central bore 34 to the second electrode 26, forming many more ions and electrons. A portion of the resultant plasma rapidly passes through the opening 32 and arcing commences between the first electrode 13 and second electrode 26 across the gap 27.

The subsequent operation will be described with reference to FIGURES 4a to 4e in conjunction with FIGURES 5a to 5e. FIGURES 5a to 5e graphically show the pulse waveform applied to the pinch tube 9 and each figure indicates the point in the waveform at which the conditions shown in the corresponding one of FIGURES 4a to 4e obtain.

Referring first to FIGURES 4a and 5a, the pinch tube 9 is shown filled with un-ionized gas 61, except for a small area near the spark gap element 31 where ionized gas has been formed, as indicated by the stippled area 62. Thus in FIGURE 4a the tube 9 is shown just after arcing occurs across the gap 27 and the degree of current passing between the inner cylinder 24 and the outer cylinder 11 from the high current power supply 43 is that indicated at point 64 on the waveform 63 of FIGURE 5a. Due to stray inductance the current at time 64 is relatively low, but is rising rapidly.

The arc spreads whereby ionization of the gas 61 continues until all the space in the chamber 29 is filled with plasma as shown in FIGURE 4b, with current flowing between the outer and inner cylinders 11 and 24. The gas in the space between the end disc 12 and the first electrode 13 and fins 16 remains essentially neutral since no arc occurs in that space. The current is indicated at point 66 on curve 63 in FIGURE 5b for the conditions in FIGURE 4b. At this time the plasma has a low resistance so that a large quantity of arc current passes therethrough. The current across the insulator 21 causes contaminants to be released from the insulator 21 into the plasma.

The described radial current through the plasma creates a magnetic field which accelerates the plasma away from the insulator 21 as shown in FIGURE 4c, since the magnetic field from current in a conductor causes the conductor to assume the largest loop possible. Thus the plasma within chamber 29 plus the contaminants from the insulator are swept along the chamber away from the insulator 21. Due to the lesser diameter, the magnetic field is somewhat more intense near the inner cylinder 24, and the plasma nearer the inner cylinder is more rapidly accelerated so that the interface of the plasma is slanted as shown in FIGURE 4c. At this time, and as shown in FIGURE 5c, the current has risen to an intermediate value 67 on waveform 63.

As shown in FIGURE 4d the contaminated plasma is swept between the fins 16 and into the space adjacent cylinder end closure 12 including the space within tube 17. The impurities previously released into the plasma from the insulator 21 are accelerated along with the plasma and thus the annular portion of the chamber 29 is left free of plasma and contaminants. The plasma between the first and second electrodes 13 and 26 is therefore left isolated from the contaminated plasma and from the insulator 21. At this time current is rising towards its maximum value as indicated at point 68 on curve 63 of FIGURE 5d. However, the current is no longer acting to accelerate the contaminated plasma but is limited to the pure plasma between the electrodes 13 and 26. The current formerly passing directly from the outer cylinder 11 to the inner cylinder 24 is now switched through the fins 16 to the first electrode 13 and thence across the gap 27 to the second electrode 26.

As shown in FIGURE 4e, the magnetic field from the current through the pure plasma between the first and second electrodes 13 and 26 pinches the plasma into a very dense column, the effect being well understood within the art. By the time the stages of operation shown in FIGURES 4a to 4e have transpired, the current has risen to a peak value 69 on the waveform 63 as shown in FIGURE 5e. Thus the peak current is applied to the pinched plasma, causing maximized heating of the plasma. Owing to the random motion of the plasma particles in the column, various reactions occur therebetween, many such reactions being well known within the art. The text "Controlled Thermonuclear Reactions," by Glasstone and Lovberg, D. Van Nostrand Co., Inc., Princeton, New Jersey, published 1960, pages 13 and 14, for example, discusses typical reactions within a heated plasma. With a rise in the temperature of the plasma, the rate of many such reactions increases. By preventing impurities from entering the plasma, the invention allows a plasma temperature to be attained which is significantly higher than in prior pinch tubes of comparable operating parameters. Thus the invention provides an efficient source of ions and neutrons and may be utilized to initiate thermonuclear reactions.

In one embodiment of the invention as herein described, the outer cylinder 11 has a diameter of six inches and a length of sixteen inches while the inner cylinder 24 has a diameter of four inches and a length of twelve inches. Thus the chamber 29 is approximately one inch thick in the radial direction. The distance between the first electrode 13 and second electrode 26 is generally set at about one inch at the widest point. The high current power supply 43 has a capacitance bank of 50 to 100 microfarads and the output voltage is varied from 30,000 to 60,000 volts. The particular optimum capacitance, voltage and electrode spacing values are best determined empirically and are dependent on the type of fuel gas, the amount of stray inductance in the circuitry and other variable factors. The above specified parameters are intended to illustrate characteristics of but one example of the invention and should not be considered as critical to satisfactory utilization of the invention. In some instances, it may be preferred to dispose baffles between the fins 16 and end closure 12 to reduce reflection of the accelerated contaminated plasma back through the fins 16. In FIGURE 6 there is shown a simplified longitudinal section view of the invention with baffles 81, comprised of concentric cylinders, for dispersing the accelerated plasma. The baffles 81 are disposed coaxially between the outer cylinder 11 and the tube 17 at the end closure 12. The accelerated plasma is reflected by the end closure 12, but due to minor surface irregularities in the end closure 12 and to collision with incoming plasma, the ordered motion of the plasma is dissipated against the baffles 81.

As a further variation, the surface of the insulator 21 facing the chamber 29 can be beveled so that the outer edge of the insulator 21 is nearer the end closure 12 than the inner edge thus cancelling the uneven plasma acceleration as shown in FIGURE 4c, with the objective of having the interface of the accelerated plasma aligned with a radius of the tube 9 at the moment the interface passes the gap 27.

Thus while the invention has been disclosed with respect to a specific embodiment, it will be apparent to those skilled in the art that numerous variations and modifications may be made within the spirit and scope of the invention and it is not intended to limit the invention except as defined in the the following claims.

What is claimed is:

1. In apparatus for generating and heating an ion-electron plasma, the combination comprising:
    (a) a hermetically sealed housing formed of electrically conductive material,
    (b) an insulator mounted within said housing,
    (c) a first electrode disposed within said housing in spaced apart relationship from said insulator and from the wall of said housing,
    (d) a long conducting shaft disposed in said housing and extending from said insulator to the region of said first electrode, said shaft having an end surface facing said first electrode and spaced apart therefrom to form a second electrode,
    (e) a plurality of electrical conductors extending from said first electrode to the wall of said housing in a direction substantially perpendicular to that of said shaft, said conductors being spaced apart to provide passageways for plasma therebetween,
    (f) means for evacuating said housing,
    (g) means for admitting gas to said housing,
    (h) an electrical power supply connected between said housing and said shaft at points remote from said first and second electrodes,
    (i) a discharge initiating means disposed centrally within said housing and adjacent said first and said second electrodes, and
    (j) means correlating activation of said discharge initiating means with activation of said power supply.

2. A magnetohydrodynamic device for producing and heating a plasma comprising, in combination:
    (a) a long conductive hermetically sealed housing,
    (b) an insulator disposed at a first end of said housing,
    (c) a long first electrode assembly mounted on said insulator and projecting a substantial distance within said housing,
    (d) a second electrode disposed within said housing between said first electrode assembly and the second end of said housing and being spaced from each thereof,
    (e) means electrically connecting said second electrode to said housing, said means extending from said second electrode in a direction normal to said first electrode assembly and having plasma passages therethrough,
    (f) a vacuum pump coupled to said housing,
    (g) a gas supply coupled to said housing,
    (h) a power supply connected between said first electrode assembly and said housing at said first end thereof,
    (i) a discharge initiating means centrally disposed at said first and said second electrodes, and
    (j) a timing means correlating activation of said power supply with operation of said discharge initiating means.

3. In a plasma generating and heating device, the combination comprising:

(a) a long hermetically sealed conductive annular housing, (b) an apertured insulator mounted in a first end of said housing, (c) a long first electrode assembly transpierced through said aperture in said insulator and projecting along the axis of said housing toward the second end thereof, (d) a broad second electrode disposed between said first electrode assembly and said second end of said housing in spaced relation to each thereof, (e) a plurality of angularly spaced apart conductors having gaps therebetween and electrically connecting said second electrode to the adjacent wall of said housing, (f) means for evacuating said housing, (g) means for admitting gas to the interior of said housing, (h) a power supply coupled across said first electrode assembly and said housing at said first end thereof, (i) a spark gap disposed adjacent said first and said second electrode assembly, and (j) a timer co-ordinating activation of said power supply with activation of said spark gap.

4. In a plasma generating device, the combination comprising:

(a) a long cylindrical hermetically sealed housing formed of electrical conductor, (b) an annular insulator forming a first end wall, (c) a long conductive inner cylinder having an end supported by said insulator and having a lesser diameter than said housing, said inner cylinder being disposed within said housing and extending a distance along the axis thereof, (d) a first broad disc shaped electrode disposed at the unsupported end of said inner cylinder within said housing, (e) a second broad disc shaped electrode disposed coaxially within said housing and facing said first electrode in spaced apart relationship with said first electrode and said housing, (f) a plurality of angularly spaced conductors extending radially from said second electrode to said housing and having space therebetween for passage of plasma, (g) means for evacuating said housing, (h) a gas source coupled to said housing, (i) a high current power supply connected to said housing and said inner cylinder at said insulator, (j) a charged particle generating and injecting means communicated with the space between said first and second electrodes, and (k) means correlating activation of said particle generating and injecting means with activation of said power supply.

5. In a magnetohydrodynamic device, the combination comprising:

(a) a long cylindrical hermetically sealed housing formed of electrical conductor, (b) a broad circular first electrode disposed coaxially in said housing and spaced from a first end thereof, (c) conductor means extending radially from said first electrode to the adjacent inside wall of said housing, said conductor means having openings therethrough, (d) an insulator mounted at the second end of said housing, (e) a long inner cylinder disposed coaxially within said housing and having a first end supported by said insulator and the second end forming a broad circular second electrode facing said first electrode and spaced therefrom, (f) a vacuum pump coupled to said housing, (g) a gas source coupled to said housing, (h) a high current power supply having first and second output terminals, (i) a high current switch, (j) a plurality of coaxial cables each having a pair of conductors connecting said first and second terminals of said power supply with said housing and said inner cylinder respectively, said connections being made through said switch and being made at points on said inner cylinder spaced angularly around the perimeter thereof and remote from said second end thereof, (k) a spark gap device disposed adjacent said first and said second electrodes and communicated with the central portion of the space therebetween, and (l) timing means correlating activation of said spark gap assembly with closing of said switch.

6. In a plasma generating device, the combination comprising:

(a) a conductive hermetically sealed cylindrical housing, (b) an insulator forming a portion of the wall of said housing at a first end thereof, (c) a broad first electrode disposed within said housing normal to the axis thereof, said first electrode having a substantially smaller diameter than said housing and being spaced from a second end thereof, (d) a plurality of spaced apart conductors electrically connected from said first electrode to said housing and extending in a direction substantially normal to the axis of said housing whereby plasma may pass therebetween, (e) a tubular conducting member mounted on said insulator and extending longitudinally within said housing towards the second end thereof and having a broad end facing said first electrode and spaced therefrom, (f) means for evacuating said housing, (g) a gas supply connected to said housing, (h) a power supply connected between said housing and said tubular member in the region of said insulator, (i) an arc initiating means disposed centrally at the space between said first electrode and the broad end of said tubular member, and (j) a timing means for correlating the activation of said power supply with said arc initiating means.

7. In a plasma generating and heating device, the combination comprising:

(a) an annular hermetically sealed housing formed of an electrical conductor, (b) an insulator disposed at a first end of said housing, (c) an annular long first electrode of substantially lesser diameter than said housing, said first electrode being supported at one end by said insulator and extending along the axis of said housing towards the second end thereof and having a broad circular end facing said second end of said housing, (d) a second annular electrode disposed along the axis of said housing between said first electrode and said housing between said first electrode and said second end of said housing and spaced apart from each thereof, (e) an annular perforated conductor providing passageway for plasma bodies therethrough disposed coaxially within said housing in the region of said second electrode and electrically connecting the inside wall of said housing with said second electrode at a plurality of points around the perimeter thereof, (f) a vacuum pump communicating with said housing, (g) means for admitting gas to said housing, (h) a power supply connected between said housing and said first electrode assembly in the region of said insulator, (i) means for injecting charged particles into the gap between said first and second electrodes, and (j) and means correlating operation of said charged particle injection means with activation of said power supply.

8. In a magnetohydrodynamic device, the combination comprising:
   (a) a cylindrical conducting hermetically sealed housing,
   (b) a broad circular first electrode disposed coaxially within said housing in spaced apart relationship to a first end thereof,
   (c) a plurality of angularly spaced conducting fins extending radially from said first electrode to said housing, said fins being spaced apart to provide gaps for the passage of plasma,
   (d) an insulator mounted at the second end of said housing,
   (e) a cylindrical second electrode assembly transpierced through said insulator and projecting within said housing in coaxial relationship thereto and having a broad circular end spaced from said first electrode,
   (f) means for evacuating said housing,
   (g) a gas supply communicating with said housing,
   (h) a high current power supply having a first terminal connected to said housing and having a second terminal,
   (i) a plurality of conductors connected from said second terminal of said power supply to said second electrode assembly, said conductors being connected to said assembly on the side of said insulator opposite from said second electrode and at angularly spaced points around the perimeter of said assembly,
   (j) a spark initiating means disposed adjacent the gap between said first electrode and said second electrode assembly,
   (k) a second power supply for energizing said spark initiating means, and
   (l) a timing circuit for controlling the energization of said spark initiating means relative to the application of power to said second electrode assembly.

References Cited in the file of this patent
UNITED STATES PATENTS

| | | |
|---|---|---|
| 3,021,272 | Baker et al. | Feb. 13, 1962 |
| 3,025,429 | Gow et al. | Mar. 13, 1962 |
| 3,096,269 | Halbach et al. | July 2, 1963 |
| 3,102,088 | Clauser et al. | Aug. 27, 1963 |